United States Patent [19]

Abel

[11] 4,222,487
[45] Sep. 16, 1980

[54] SINGLE DISK CARTRIDGE

[75] Inventor: Allen J. Abel, Roseville, Minn.

[73] Assignee: Minnesota Mining and Manufacturing Company, St. Paul, Minn.

[21] Appl. No.: 29,528

[22] Filed: Apr. 12, 1979

[51] Int. Cl.² .................. B65D 85/02; B65D 45/00
[52] U.S. Cl. .................... 206/444; 346/137; 206/405
[58] Field of Search .......... 206/444, 405, 406, 303; 346/137

[56] References Cited

U.S. PATENT DOCUMENTS

| | | | |
|---|---|---|---|
| 3,469,681 | 9/1969 | Norman, Jr. | 206/405 |
| 3,504,652 | 4/1970 | Norman, Jr. | 206/405 |
| 3,753,490 | 8/1973 | Mowrey | 206/406 |
| 4,013,169 | 3/1977 | Cheney | 206/444 |

Primary Examiner—William T. Dixson, Jr.
Attorney, Agent, or Firm—Cruzan Alexander; Donald M. Sell; William L. Huebsch

[57] ABSTRACT

A latch assembly for releasably retaining a bottom cover against a top cover in a disk cartridge. The latch assembly is manually activatable from outside the bottom cover and includes a portion adapted to enter and releasably engage in an opening in an end of the hub accessible through an aperture in the top cover; and is mounted on the bottom cover so as to restrict radial movement of the disk assembly while being axially movable to both facilitate engaging the latch assembly with the hub, and allow axial movement of an engaged disk assembly within the top cover.

3 Claims, 6 Drawing Figures

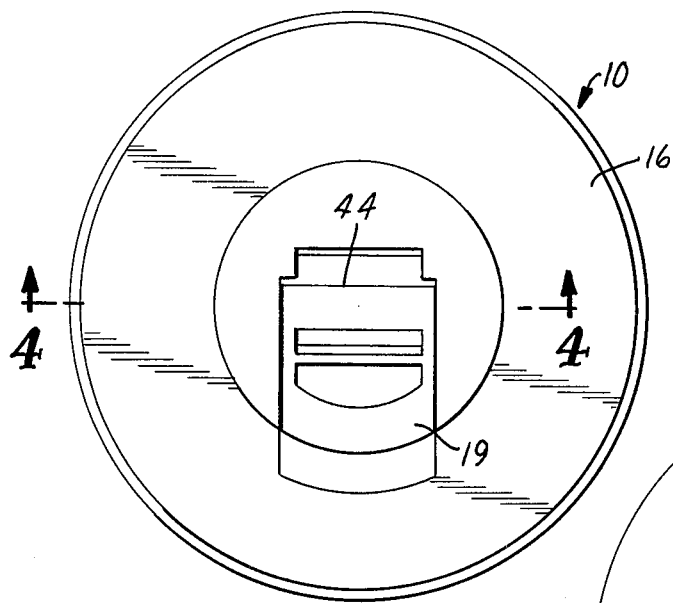
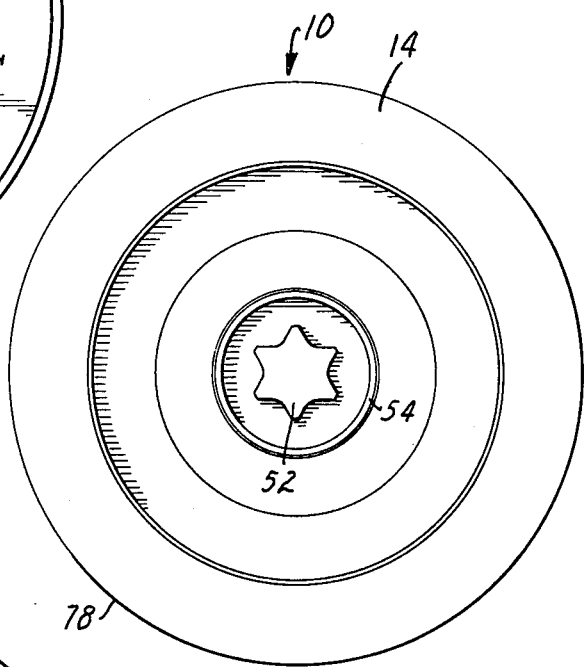
FIG. 1
FIG. 2
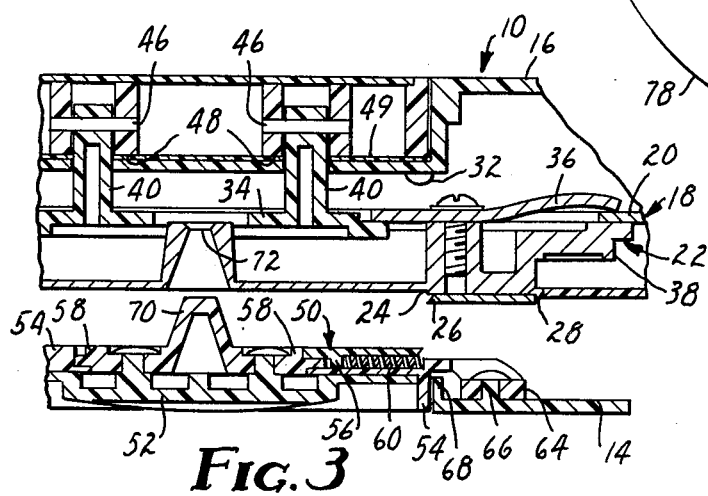
FIG. 3
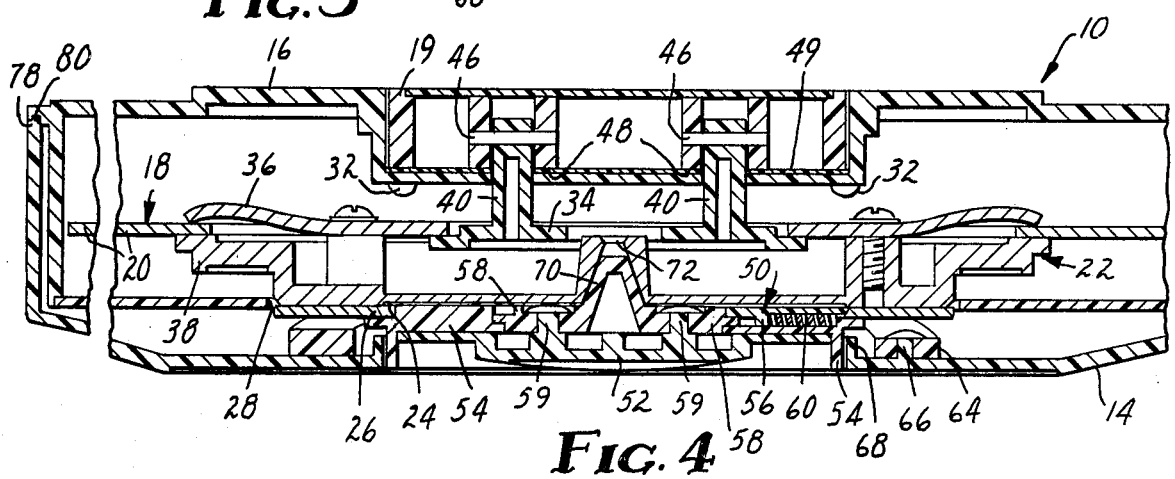
FIG. 4

SINGLE DISK CARTRIDGE

BACKGROUND OF THE INVENTION

This invention relates to single disk cartridges for use in computer peripheral equipment and in one important aspect to the means in a disk cartridge for releasably retaining a bottom cover of a disk cartridge against a top cover of the disk cartridge.

Typically, such a disk cartridge includes a disk assembly consisting of a single recording disk supported on a hub, which disk assembly is enclosed in a protective top cover having an aperture affording access to one end of the hub; and a pivotably mounted handle on the side of the top cover opposite the aperture. The handle either is permanently coupled, or can be coupled by engagement of a coupling mechanism activated via a thumb-operated slide on the handle, to structure in the cartridge for moving the disk assembly axially away from the aperture to a position adjacent the wall of the top cover opposite the aperture when the handle is moved to a raised position, and for affording movement of the disk assembly axially toward the aperture and rotation of the disk assembly within the top cover when the handle is moved to a lowered position. Such movement of the disk assembly is used in two ways. First, it is used in loading or unloading the disk cartridge from a disk drive machine. The disk assembly is moved adjacent the wall of the top cover opposite the aperture by raising the handle before the cartridge is inserted in the disk drive machine. After the cartridge is inserted, the handle is lowered, which allows the hub of the disk assembly to engage a magnetic chuck through the aperture in the top cover of the disk cartridge so that the disk assembly can be rotated via the chuck and heads in the machine can read and write magnetically encoded information on the disk assembly. To subsequently remove the disk cartridge from the disk drive machine the disk assembly is again moved adjacent the wall of the top cover opposite the aperture by raising the handle, which, because the top cover is supported in a fixed position relative to the chuck, pulls the disk assembly away from the magnetic chuck so that the disk cartridge can be lifted out of the machine.

Secondly, it is used for releasing a bottom cover which may be secured to the top cover, which bottom cover is used during storage of the disk cartridge to restrict dust from entering the disk cartridge. The bottom cover has a ring of permanent magnets disposed adjacent the aperture when the bottom cover is in place to magnetically engage the hub of the disk assembly. The bottom cover is removed by moving the disk assembly adjacent the wall of the top cover opposite the aperture by raising the handle, which, because the top cover remains in a fixed position relative to the bottom cover, moves the disk assembly away from the permanent magnets, whereupon the bottom cover can be removed.

While these means for releasably attaching the bottom cover are effective, they are more expensive than may be desired because of the cost of the permanent magnets that attach the bottom cover to the hub. Also, the coupling mechanism used in some disk cartridges is more complex and expensive than may be desired, whereas with the disk cartridges that do not provide this coupling mechanism, a user cannot raise the handle to carry the disk cartridge around without releasing the bottom cover.

Additionally, the attached bottom cover provides little protection against damage to the disk assembly if the cartridge is dropped on its edge. Under such circumstances the hub can slide sideways on the magnets in the bottom cover, ride up and tip over a centering pin, and impact against the top cover.

BRIEF DESCRIPTION OF THE INVENTION

The present invention provides a disk cartridge generally of the type described above which has a much simplified and more inexpensive means for maintaining a bottom cover against a top cover of the disk cartridge, which means allows the coupling mechanism of the prior art disk cartridge to be deleted while still allowing the disk cartridge to be carried by the handle when the bottom cover is in place, and which provides substantial protection against damage to a disk in the disk cartridge if it is dropped on its edge.

The means for releasably retaining the bottom cover against the top cover in the disk cartridge according to the present invention comprises a manually activatable latch assembly on the bottom cover including a portion adapted to enter and releasably engage in an opening in an end of the hub accessible through the aperture in the top cover. The latch assembly is mounted on the bottom cover via means which restricts movement of the latch assembly and thereby the disk assembly radially of the disk assembly to restrict damage to the disk assembly should the disk cartridge be impacted on its edge, but which allows the latch assembly to move toward and away from the top cover to both (1) facilitate positioning the portion of the latch assembly in the opening prior to its engagement with the hub, and (2) allow subsequent axial movement of the disk pack within the top cover so that the handle can be permanently coupled to the disk assembly by means that raise the disk assembly when the handle is raised and the handle can be raised and lowered when the bottom cover is attached to facilitate carrying and storing the disk cartridge.

In a preferred embodiment the hub of the disk assembly has an inwardly projecting lip around the inlet of the opening, and the latch assembly includes a plug having a portion adapted to enter the opening when the bottom cover is engaged with the top cover. Latch members are mounted on the plug for movement from retracted positions (which retracted positions afford movement of the portion of the plug into and out of the opening); and engaging positions with the latch members extended so that they can engage behind the lip and retain the portion of the plug in the opening. The latch members may be biased to their retracted positions and may be moved from their retracted positions to their engaging positions by means of a cam mounted on the plug for rotation via a knob accessible for manual operation from the outer surface of the bottom cover.

BRIEF DESCRIPTION OF THE DRAWING

The invention will be further described with reference to the accompanying drawing wherein like numbers refer to like parts in the several views, and wherein:

FIG. 1 is a top plan view of a single disk cartridge according to the present invention;

FIG. 2 is a bottom view of the disk cartridge of FIG. 1;

FIG. 3 is an enlarged sectional view taken approximately along lines 4—4 of FIG. 1, but which shows a bottom cover of the disk cartridge separated from its top cover;

FIG. 4 is an enlarged sectional view taken approximately along lines 4—4 of FIG. 1;

DESCRIPTION OF THE PREFERRED EMBODIMENT

Figure 6:
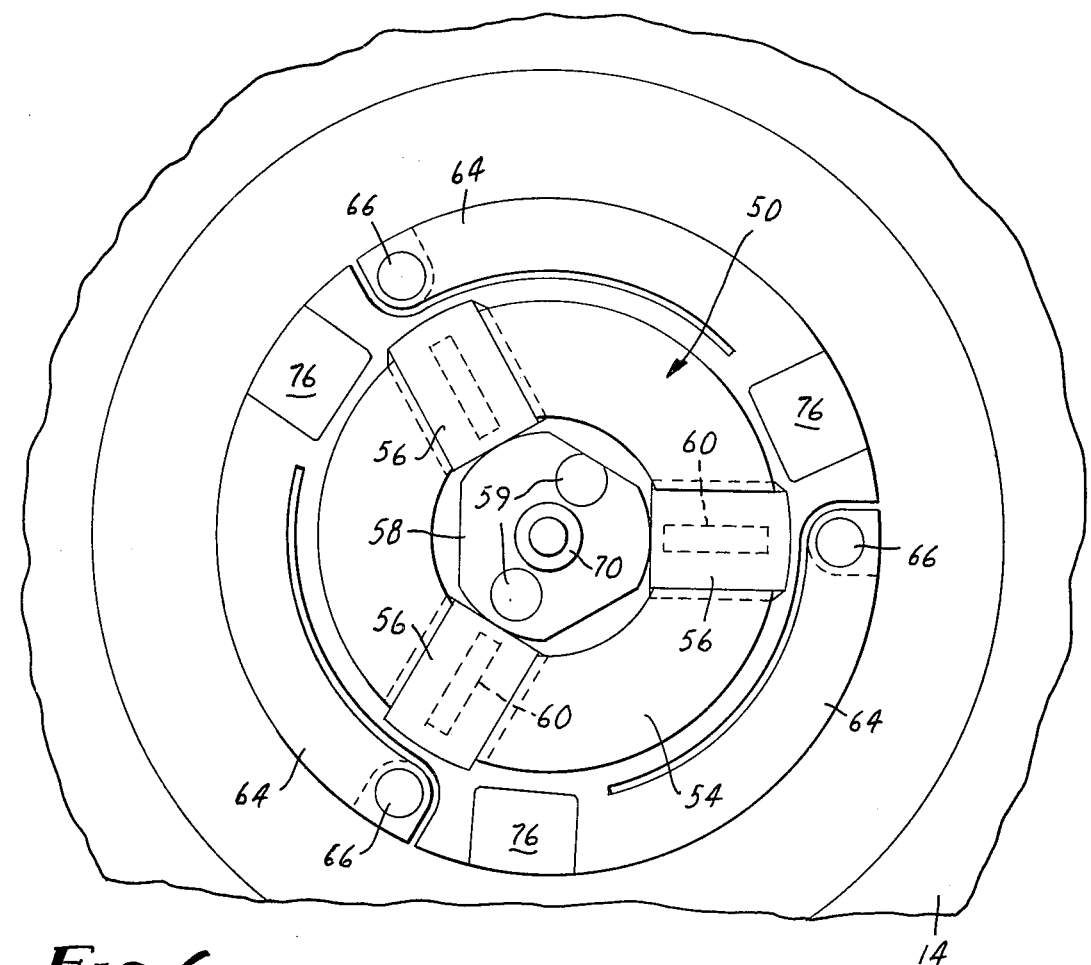
FIG. 6 is an enlarged fragmentary plan view of a latch assembly in the bottom cover of the disk cartridge of FIG. 1.

Referring now to the drawing, there is shown a disk cartridge generally designated by the reference numeral 10 including means according to the present invention for releasably retaining a bottom cover 14 against a top cover 16 of the disk cartridge 10 to completely enclose a disk assembly 18 in the disk cartridge 10.

Except for the difference in the means for releasably retaining the bottom cover 14 against the top cover 16 and simplifications afforded thereby in the coupling between a handle 19 for the disk cartridge 10 and the disk assembly 18 the disk cartridge 10 is generally the same as the disk cartridge sold under the trade designation "5440" by the International Business Machines Corporation, the characteristics of which are described in production reference literature entitled "Reference Manual, IBM 5440 Disk Cartridge Requirements" available from International Business Machines Corporation, Commercial Development, Armonk, N.Y. 10504, the contents of which are incorporated herein by reference.

The disk assembly 18 in the disk cartridge 10 consists of a single recording disk 20 coated by magnetizable material and supported on a hub 22, which hub 22 has an opening 24 in one end and an inwardly projecting lip 26 around the inlet of the opening 24 which provides a portion of the means for releasably retaining the bottom cover 14, as will later be explained. The top cover 16 encloses the disk assembly 18 and has an aperture 28 affording access to the end of the hub 22 in which the opening 24 is located and through which aperture 28 a magnetic chuck on a disk drive machine (not shown) may engage the hub 22, (as was previously explained), as well as affording access to the hub 22 for a portion of the means for releasably retaining the bottom cover 14 which is mounted on the bottom cover 14.

Figure 5:
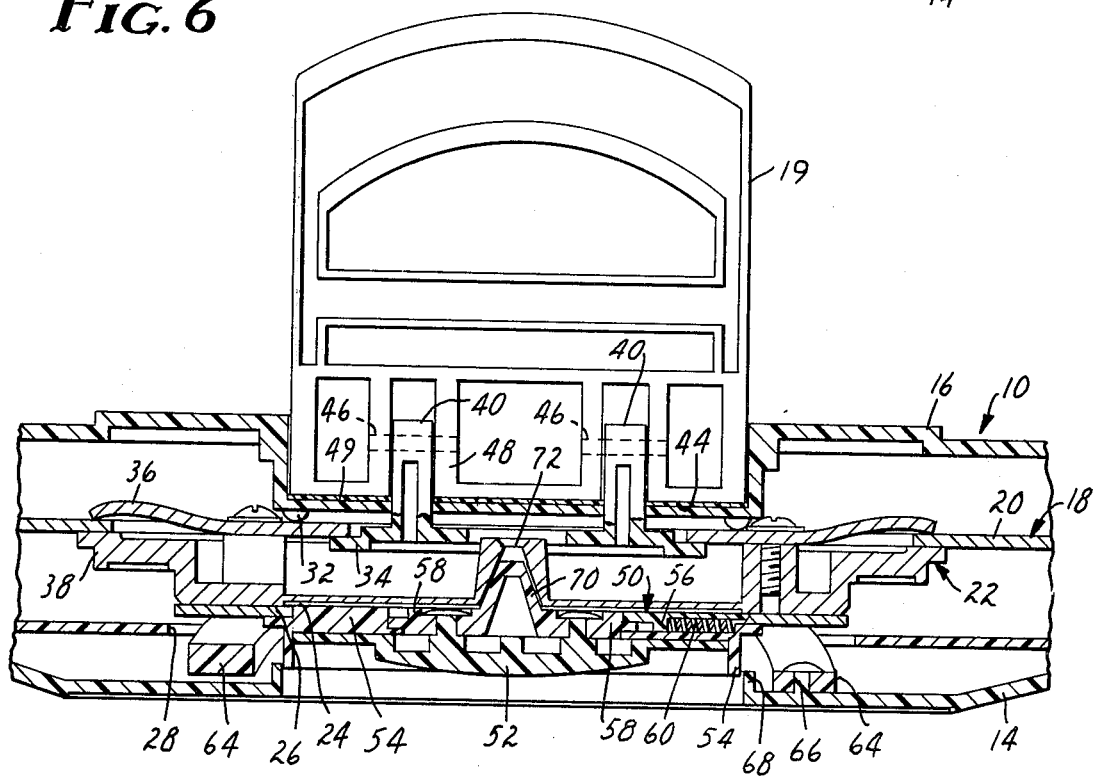
FIG. 5 is an enlarged sectional view taken approximately along the lines 4—4 of FIG. 1, but shown with a handle of the disk cartridge in its raised position.

Means are provided for moving the disk assembly 18 axially in the top cover 16 to afford its removal from a disk drive machine in the manner previously explained, including the handle 19 which is mounted for pivotal movement relative to the top cover 16 between a raised position (FIG. 5) and a lowered position (FIGS. 1, 3 and 4) in a recess in the tape cover 16; and means permanently coupled between the handle 19 and the disk assembly 18 for moving the hub 22 axially away from the aperture 28 and pressing it against rubber snubbing buttons 32 on the top cover 16 when the handle 19 is raised, and for allowing the disk assembly 18 to move toward the aperture 28 to a position where it can rotate within the top cover 16 when the handle 19 is lowered.

The means permanently coupled between the handle 19 and the disk assembly 18 includes a circular draw plate 34 enclosed within a cavity defined by a circular top plate 36 and a dished bottom plate 38 which form the hub 22 for the disk assembly 18. Attached to the draw plate 34 are parallel rods 40 extending through a circular central opening in the top plate 36 of the hub 22, which opening allows the top plate 36 to rotate around the rods 40. The rods 40 are slidably mounted in the top cover 16, and are each pivotably attached via pins 46 at their ends opposite the draw plate 34 to the handle 19 at a position in the handle 19 more closely spaced from the side of the handle 19 adjacent the top cover 16 when the handle is lowered than to an end 44 of the handle 19, which end 44 is positioned adjacent the top cover 16 when the handle 19 is raised. During raising of the handle 19, a somewhat rounded side surface portion 48 of the handle 19 will serve as a cam against the outer surface of a bearing plate 49 of a slippery polymeric material (e.g., "Teflon") disposed around the rods 40 to pull the hub 22 of the disk assembly 18 against the snubbing buttons 32; whereas lowering the handle 19 allows the disk assembly 18 to move away from the buttons 32 to a central location in the top cover 16 where it can be rotated about the draw plate 34 and rods 40 via a disk-drive machine magnetically engaging the hub 22.

The manually activatable means for releasably retaining the bottom cover 14 against the top cover 16 includes a latch assembly 50 adapted for manual activation from the outer surface of the bottom cover 14 via rotation of a knob 52, which latch assembly 50 has a portion adapted to enter the opening 24 in the hub 22 and engage behind the lip 26 thereabout; means mounting the latch assembly 50 on the bottom cover 14 for movement axially of the hub 22 when the covers 14 and 16 are engaged from an outer position to an inner position relative to the bottom cover 14 to afford both (1) manual insertion of the latch assembly 50 in the opening 24 prior to engagement of the latch assembly 50 with the hub 22 and (2) subsequent movement of the engaged latch assembly 50 with the hub 22 as the handle 19 is raised (FIG. 5) and lowered (FIG. 4) while restricting movement of the latch assembly 50 radially of the bottom cover 14 and thereby radial movement of the disk assembly 18 when the latch assembly 50 is attached to the hub 22 to restrict contact between the edge of the disk 20 and the top cover 16; and means for biasing the latch assembly 50 toward its outer position to bias the bottom cover 14 against the top cover 16 in all positions of the disk assembly 18 within the top cover 16 when the latch assembly 50 is engaged with the hub 22.

The latch assembly comprises (1) a generally circular plug 54 and a plurality of (three) plate-like latch members 56 mounted on the plug 54 for sliding movement radially of the plug 54 between retracted positions at which the portion of the plug 54 on which the latch members 50 are mounted can enter the opening 24 in the hub 22, and extended positions at which the tapered outer end portions of the latch members 56 will engage behind the lip 26 and retain the latch assembly 50 in engagement with the hub 22 when the end portion of the latch assembly 50 is in the opening before the latch members 50 are moved to their extended positions; and (2) manually activatable means for moving the latch members 50 between their retracted positions and their extended positions comprising a compression spring 60 positioned between each latch member 56 and the plug 54 to bias the latch member 56 toward its retracted position, and a cam 58 positioned against the inner edge surfaces of the latch members 56. The cam 58 is fixed to the knob 52 via pins 59 and is mounted in the plug 54 for rotation via the knob 52 through an arc limited by the length of a slot in the plug 54 in which a projection (not shown) revolves between a latched position in which lobes on the cam 58 engage and move the latch members 56 to their engaging positions in opposition to the springs 60 (FIG. 6); and an unlatched position in which flat portions on the cam 58 are adjacent the latch members 56 so that the springs 60 will return the latch members 56 to their retracted positions.

The means mounting the latch assembly 50 on the bottom cover 14 for movement axially of the disk assembly 18 when the covers 14 and 16 are engaged comprises three arcuate spring members 64 integrally molded with the plug 54 of a flexible resilient polymeric material so as to be attached to the plug 54 at one end, and which arcuate spring members 64 have their opposite ends attached to the bottom cover via rivets 66. Manual pressure applied axially on the knob 52 to press the portion of the latch assembly 50 into the opening 24 in the hub 22 or force exerted through the hub 22 via the handle 19 when the latch assembly 50 is engaged with the hub 22 will cause the arcuate spring members 64 to flex so that the latch assembly 50 can move axially in a close-fitting opening in the bottom cover 14 relative to the bottom cover 14 between its inner or outer positions, and the latch assembly 50 is dimensioned so that the spring members 64 will be at least slightly deflected when the latch assembly 50 is engaged with the hub 22 to bias the bottom cover 14 into engagement with the top cover 16. Movement of the latch assembly 50 radially of the bottom cover 14 is restricted both by the transverse inflexibility of the spring members 64 attached between the plug 54 and bottom cover 14, and by close fitting sliding engagement between a cylindrical portion of the plug 54 and a surrounding hollow cylindrical central collar portion 68 of the bottom cover 14. The close fitting engagement between the cylindrical portion of the plug 54 and the collar portion 68 also restricts dust from entering the disk cartridge 10 around the latch assembly 50.

The latch assembly 50 also includes means for centering the hub 22 adjacent the end portion of the latch assembly 50 adapted to enter the opening 24 in the hub 22, which centering means is provided by a truncated conical projection 70 centered on the cam 58. When the latch assembly 50 is pressed toward the hub 22, the projection 70 will enter a mating opening 72 centered in the hub 22 and center the hub 22 on the latching assembly 50 so that the portion of the plug 54 on which the latch members 50 are mounted will enter the opening 24 in the hub 22 until spaced raised surface portions 76 on the plug 54 contact the adjacent surface of the hub 22 to align the latch member 56 for engagement behind the lip 26 upon rotation of the knob 52 to its latched position.

To attach the bottom cover 14 to the top cover 16 a user simply engages a peripheral edge 78 of the bottom cover against a gasket in an annular groove 80 around the top cover 16 (FIG. 4), applies pressure against the knob 52 to move the latch assembly 50 axially of the bottom cover 14 and hub 22 via flexing of the arcuate spring members 64 so that the end of the latch assembly 50 enters the opening 24 in the hub 22 (which can be done either when the handle 19 is raised so that the disk assembly 18 is pulled against the top cover 16 or when the handle 19 is lowered so that the disk assembly 18 is loose in the top cover 16) and rotates the knob 52 to its latched position so that the cam 58 moves the latch members 56 radially outwardly into engagement behind the lip 26 around the opening 24. Subsequently the handle 19 can be raised or lowered and the latch assembly will move within the bottom cover 14 with the disk assembly 18 via a flexing of the arcuate spring members 64 which will at all times be flexed sufficiently to bias the bottom cover 14 tightly against the top cover 16. To remove the bottom cover 14 a user simply rotates the knob 52 to its unlatched position and thereby the cam 58 to its position at which the springs 60 retract the latch members 56, the latch assembly 50 withdraws from the opening 24 under the influence of the spring members 64 and the bottom cover 14 can be removed.

I claim:

1. A disk cartridge comprising a disk assembly having an axis and including a central hub having an opening on one end; a protective top cover enclosing said disk assembly and having an aperture affording access to the end of said hub having the opening; a handle pivotably mounted at the side of said top cover opposite said aperture for movement between raised and lowered positions; means coupled to said handle for moving said disk assembly axially away from said aperture when said handle is raised and for affording axial movement of said assembly toward said aperture when said handle is lowered; a removable bottom cover adapted to engage said top cover over said aperture; means for releasably attaching said bottom cover to said disk assembly comprising a manually activatable latch assembly adapted to enter said opening and releasably engage said hub; means mounting said latch assembly on said bottom cover for movement relative to said bottom cover axially of said hub when said bottom cover is engaged with said top cover from an outer position to an inner position to afford manual insertion of said latch assembly into said opening prior to engagement of said latch assembly, and subsequent movement of said latch assembly with said hub as said handle is raised and lowered; and means for biasing said latch assembly toward said outer position to bias said bottom cover against said top cover in all positions of said disk assembly within said top cover.

2. A disk cartridge according to claim 1 wherein said hub has an inwardly projecting lip around the inlet of said opening, and said latch assembly includes a plug having a portion adapted to enter said opening when said bottom cover is engaged with said top cover, latch members mounted on said portion of the plug for movement from retracted positions affording movement of said portion of the plug into and out of said opening, and engaging positions with said latch member positioned to engage behind said lip and retain said portion of the plug in said opening when said portion of the plug is in said opening; and means adapted for manual activation for moving said latch members between said retracted positions and said engaging positions.

3. A disk cartridge according to claim 1 or claim 2 wherein said means mounting said latch assembly on said bottom cover for movement includes means for restricting movement of the latch assembly transverse of said bottom cover so that radial movement of said disk assembly is restricted when said latch assembly is engaged with said hub.

* * * * *